Dec. 30, 1952     S. G. MARINOVICH     2,623,285
PIPE-CUTTING MACHINE
Filed Dec. 1, 1951     2 SHEETS—SHEET 1
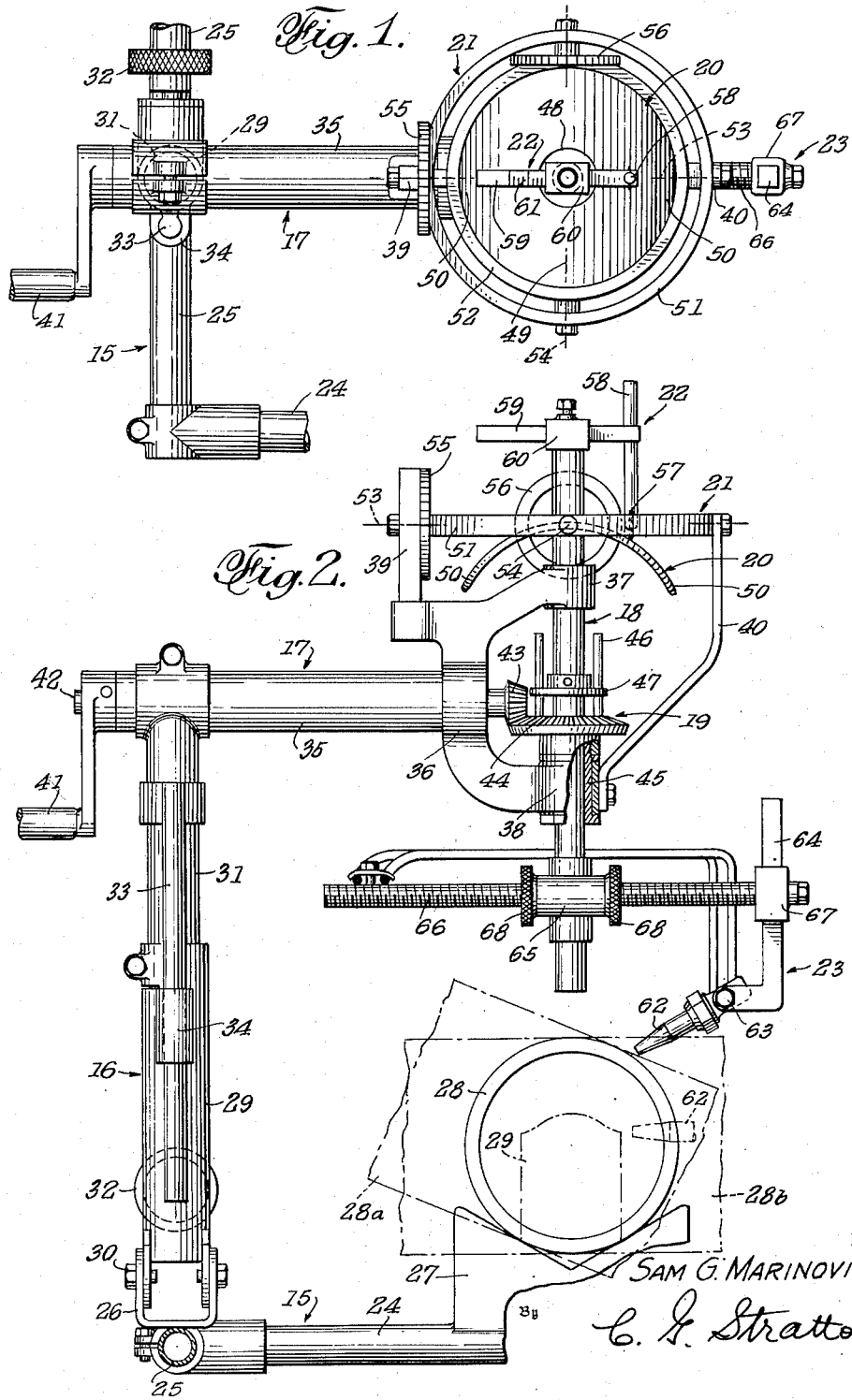
Inventor
SAM G. MARINOVICH
By C. G. Stratton
Attorney Dec. 30, 1952     S. G. MARINOVICH     2,623,285
PIPE-CUTTING MACHINE Filed Dec. 1, 1951     2 SHEETS—SHEET 2

Inventor
SAM G. MARINOVICH

By C. E. Stratton
Attorney

Patented Dec. 30, 1952

2,623,285

UNITED STATES PATENT OFFICE 2,623,285

PIPE-CUTTING MACHINE

Sam G. Marinovich, Los Angeles, Calif.

Application December 1, 1951, Serial No. 259,468

7 Claims. (Cl. 33—21)

This invention relates to a machine for cutting pipes where they are to be joined or intersected by other pipes. Where the end of one pipe joins an intermediate part of another pipe, said end of the first pipe must be cut so as to fit the curvature of the second pipe, and said second pipe must be provided with a hole conforming in its contour to the contour of the end of the first pipe. Thus, the two pipes may be interfitted and then joined in any of the usual manners as by welding or soldering along the joint or seam.

Two such joined pipes may be of the same diameter or different diameters; they may join or intersect squarely with their axes in the same plane and at right angles; they may intersect squarely with their axes offset relatively and at right angles; they may intersect with their axes coplanar and at an angle other than a right angle; or they may intersect with their axes relatively offset and at an angle other than a right angle. Thus, regardless of the relative sizes of their diameters, two pipes may intersect in the above-mentioned four different ways.

Heretofore, expensive machines, requiring interchangeable parts and cams, were needed to enable cutting of pipes intersecting in said four different ways. The present invention contemplates, and it is an object thereof, to provide a pipe-cutting machine embodying a single templet member that requires only setting in operative position to make any desired cut in a pipe, thereby obviating the need for providing a plurality of cut-guiding cams and the attending need for selecting and installing the proper templet for a particular cut.

It is a more specific object of the invention to provide a single templet of the character referred to and to provide simple means for effecting ready adjustment of the position of said templet to control the path of movement of a cutting tool or device or a scriber, as the case may be.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is a plan view, partly broken away, of a pipe-cutting machine according to the present invention.

Fig. 2 is a side elevational view thereof, partly broken away.

Figure 3:
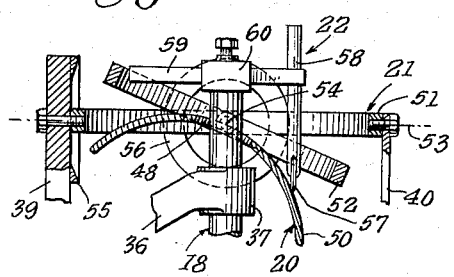
Fig. 3 is a fragmentary vertical sectional view of the cut-controlling templet and adjustment means in one position of adjustment thereof.

The pipe-cutting machine that is illustrated comprises, generally, a fixed base 15, a vertical adjustable post 16 carried by said base, a head 17 carried by said post and extending horizontally above base 15, a vertically movable spindle 18 carried by head 17, means 19 to rotate said spindle, a cut-controlling templet 20 concentric with the spindle, adjusting means 21 mounting templet 20 on head 17, a tracer 22 carried by the spindle and operatively engaged with the templet to control the rise and fall of said spindle, and pipe-cutting means 23 or the like carried by the spindle and movable therewith as controlled by said templet and tracer.

The base 15 is shown as a horizontal frame having spaced legs 24 (one of which is shown in Fig. 1 and the other in Fig. 2) connected by a member 25. In the present case, an upstanding bracket 26 is provided at the middle of member 25. Said frame is shown with support members 27 on each leg 24 for a horizontally disposed pipe 28. These members are to be considered as exemplary since any suitable means may be provided for supporting pipe 28 or a vertically disposed pipe 29, as the case may be. In fact, instead of base 15 supporting a pipe in working position, in cases where the pipe is unduly large, the base may be mounted on the pipe as can be understood. In any case, provision is made to fixedly position a pipe relative to the pipe-cutting means 23.

Post 16 is preferably adjustable for length to provide vertical adjustment for head 17 and the means carried thereby in accordance with the diameter or height size of pipe 28 or 29. As shown, said post comprises a vertical tube 29 carried on a pivot 30 on bracket 26, a telescopic tube 31 within tube 29, means to adjust tube 31 relative to tube 29 as suggested by adjusting knob 32, and means to hold said tubes relatively non-rotational and, in this case, comprising a rod or tube 33 carried by tube 31 and a guide bracket 34 carried by tube 29 and in which rod or tube 33 is guided. While the same has not been illustrated, it will be clear that pinion-and-rack, or similar adjusting means controlled by knob 32, may be provided within tubes 29 and 31 to enable length adjustment of post 16. Pivot 30 enables the post to be tilted if such is desired.

Head 17 is shown as a horizontally extending tube 35 affixed to tube 31 and a bracket 36 carried by the outer end of tube 35 and above pipe-supporting members 27. Bracket 36 may be formed in different ways, but essentially includes upper and lower aligned guide bearings 37 and 38, respectively, for spindle 18 and horizontally spaced supports 39 and 40 for templet-adjusting means 21.

Means 19 is shown as a handle 41 on one end of a shaft 42 extending through tube 35, a bevel pinion 43 on the other end of said shaft, a bevel gear 44 in mesh with said pinion and having a sleeve extension 45 between bearing 38 and spindle 18, one or more upstanding pins 46 carried by gear 44, and an apertured flange 47 affixed to the spindle and through the apertures of which said pins 46 extend. The structure thus provided rotates spindle 18 and enables vertical movement of said spindle. The coupling provided by pins 46 and flange 47 serves as a sliding key means enabling vertical movement of the spindle while the same is being rotated by handle 41.

Figure 5:
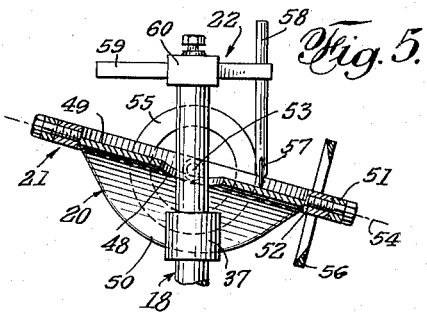
Fig. 5 is a fragmentary vertical sectional view of the cut-controlling templet and adjustment means in another position of adjustment, the same being taken at right angles to Fig. 3.

An important element of the present machine is the templet 20. The same comprises a circular plate that is formed as a segment of a cylinder. The cylindrical form is best seen in Fig. 1, while Figs. 2, 3 and 5 show the arcuate form thereof. A central opening 48 is provided in said templet to clear spindle 18 which passes therethrough. In the present instance, said templet is shown with its convex surface facing upwardly, said surface being the one engaged by tracer 22. However, the templet may be reversed so that its concave surface is uppermost and engaged by the tracer. In any case, the arcuate curvature of said templet will cause tracer 22 to rise and fall as the same describes a circular path around the axis of spindle 18. The degree of curvature of the templet is not material except that the distance between the high point along line 49 and the low point 50 at the periphery at opposite sides, should be of sufficient magnitude to provide a desired rise and fall movement of the tracer.

Templet-adjusting means 21 is here shown as two concentric rings 51 and 52 mounted on transversely arranged pivots 53 and 54, respectively. The outer ring 51 is adjustable on axis 53 and inner ring 52 (to which cam 20 is affixed) is adjustable on axis 54. Ring 51 is carried by bracket supports 39 and 40 and ring 52 is carried by ring 51. Thus, both rings and templet 20 can be adjusted together on axis 53; ring 52 and templet 20 together can be adjusted on transverse axis 54; and ring 51 can be adjusted on axis 53 and ring 52 and the templet on axis 52.

There are four positions of adjustment of templet 20: the symmetrical position of Fig. 2, the position of Fig. 3 in which the templet is swung on axis 54, the position of Fig. 5 in which the templet is swung on axis 53, and the compound position (not shown) in which the templet is swung on both said axes. The degree of tilt or swing of the templet may be determined by scale means 55 and 56 provided for the respective axes 53 and 54.

Tracer 22 comprises a tracer wheel 57 or the like carried by a post 58 mounted on the end of a bar 59 adjustably engaged in a guide block 60 on the upper end of spindle 18. Graduations 61 on said bar may be used to determine the distance of tracer wheel 57 from the center or axis of spindle 18, the same being the center of templet 20 and also the center of intersection of axes 53 and 54.

Pipe-cutting means 23 is shown as a torch 62 on a tilt-adjustable pivot 63 provided on a vertically adjustable member 64, a vertically adjustable fitting 65 mounted on the lower end of spindle 18, a horizontally adjustable threaded bar 66 in fitting 65, and a guide block 67 on the end of said bar and adjustable mounting member 64. Bar 66 is threaded as shown and is slidable in fitting 65, nuts 68 on said bar lock the same in adjusted position in fitting 65. A rough vertical adjustment for torch 62 is afforded by the fitting 65 and a finer vertical adjustment is made between member 64 and block 67. It will be clear that torch 62 describes exactly the same path as does tracer 22, both rotationally and vertically. However, the size of the circular path may be greater or smaller according to the adjustment of the torch relative to the axis of spindle 18. Also, pivot 63 allows adjustment of the torch so that it cuts at an angle into pipes 28 or 29 to provide a welding bevel, if the same is desired.

Torch 62 merely exemplifies any suitable cutting or marking tool since the machine may not only cut pipes but may mark a templet sheet or model arranged in the round shape of a pipe and then opened flat for layout or other uses.

Figure 8:
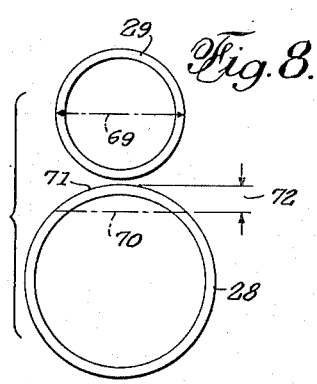
Fig. 8 shows end view of the intersecting pipes shown in Figs. 4, 6 and 7 together with lines showing the preparatory measurements that are made to determine the setting of the cut-controlling templet.

The adjustment of templet 20 is determined as indicated in Fig. 8 wherein two pipes 28 and 29, which are to be cut, for mutual intersection or joining, are shown. Said pipes are shown as different in diameter but they may be the same size. If different, the diameter 69 of the smaller pipe 28 is measured and, with a graduated straight edge, said diameter is located at 70 on the other pipe so as to subtend arc 71. Thus, diameter 69 and line 70 are equal. Now the rise 72 of arc 71 is measured. From a previously prepared table in which successive radial increments of templet 20 are related to the successively increasing rise distances of said templet along said increments, the radial distance that is related to the distance of rise 72 is read. Tracer 22 is then set at said radial distance from the center of spindle 18.

If the axes of pipes 28 and 29 intersect at right angles and are coplanar, both rings 51 and 52 are set at zero on scale means 55 and 56, i. e., both horizontal, templet 20 thereby having the symmetrical position of Fig. 2. If the hole in pipe 28 is to be cut, torch 62 is adjusted to cut a circular hole in said pipe of the size of pipe 29 and, if the end of pipe 29 is to be cut, torch 62 is adjusted accordingly as shown by the dot-dash lines of Fig. 2. Now, handle 41 is slowly turned and the cut is made in one revolution of spindle 18.

Figure 4:
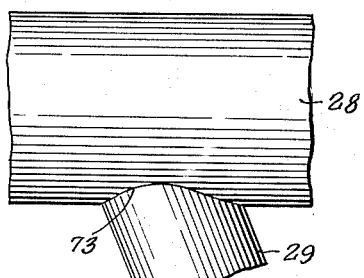
Fig. 4 is a side view of two intersecting pipes showing the form of the cut obtained by the templet position of Fig. 3.

If the axes of pipes 28 and 29 intersect at an angle other than a right angle as in Fig. 4, said angle of intersection being known, templet 20 is adjusted to said angle on axis 54, as in Fig. 3. Now, the rise is greater on one side of line 49 and substantially smaller on the opposite side. The resultant cut that is made in the end of pipe 29 is shown at 73 in Fig. 4. In order to obtain the same cut in pipe 28, the same is mounted on base 15 in a plane transverse to that shown in Fig. 2 and at the angle of intersection. This position is shown at 28a.

Figure 6:
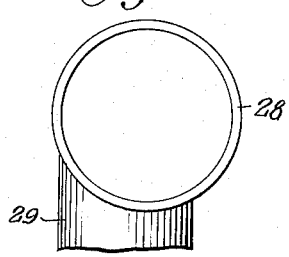
Fig. 6 is an end view of two intersecting pipes showing the form of the cut obtained by the templet position of Fig. 3.
Figure 7:
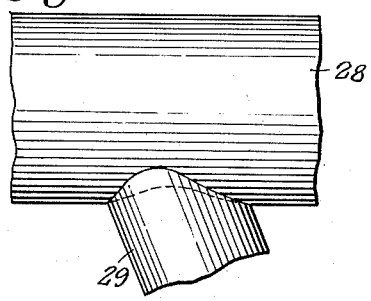
Fig. 7 is a view similar to Fig. 4 showing two intersecting pipes in which the axes of said pipes are both non-coplanar and at an angle to each other of less than 90°.

If the axes of the pipes are at right angles but offset as in Fig. 6, templet 20 is tilted on axis 53 to the angle of offset as in Fig. 5. The cut is made in pipe 29 in the vertical position shown in Fig. 2. The same cut is made in pipe 28 by arranging the same horizontally in the position of 28b of Fig. 8 but offset from the center of spindle 18 according to the offset of the pipe axes.

From the foregoing it will be clear that the fourth condition of pipe axes intersection is achieved by adjusting the templet on both axes 53 and 54, cutting pipe 29 in its upright position, and cutting pipe 28 in both the angular position of 28a and the offset position of 28b.

Figure 9:
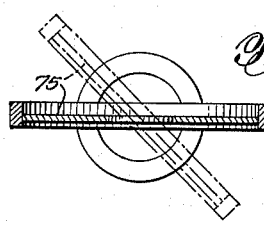
Fig. 9 is a cross-sectional view of a flat cam to replace the templet shown in Figs. 1, 2, 3 and 5 and for cutting miters and bevels on the ends of pipes.
Figure 10:
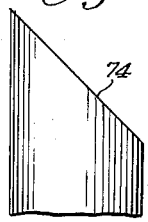
Figs. 10 and 11 are side views of pipes having ends as cut under control of the templet shown in Fig. 9.
Figure 11:

The bevels 74 of Figs. 10 and 11 are made to any desired angle by replacing templet 20 and its surrounding ring 52 with the flat templet 75 and ring 52 of Fig. 9. By means of this templet 75, bevels at any desired relative angle can be made by adjustment of said templet on axes 53 and 54 as before described.

While the invention that has been illustrated and described is now regarded as the preferred embodiments, the constructions are, of course, subject to modifications without departing from the spirit and scope of the invention. It is therefore not desired to restrict the invention to the particular forms of construction illustrated and described, but to cover all modifications that may fall within the scope of the appended claims.

Having thus described the invention, what is claimed and desired to be secured by Letters Patent is:

1. A machine of the character described comprising a spindle guided for endwise movement and means to rotate said spindle, a generally circular templet having its center on the axis of said spindle, an adjustable mount for the templet and embodying two concentric rings adjustable on axes that are at right angles to each other and in a plane transverse to the spindle axis, an adjustable tracer carried by the spindle and in operative engagement with a face of said templet to describe a circular path during rotation of the spindle, and a tool adjustably carried by the spindle and having a path of travel conforming to the path of travel of the tracer.

2. A machine according to claim 1: the face of the templet engaged by the tracer being arcuate and the spindle being moved endwise as said tracer follows the curvature of said face to move the tool accordingly.

3. A machine according to claim 1: a fixed axial mount for the outer ring, and the axis of the inner ring being carried by the outer ring.

4. In a machine of the character described, having a spindle mounted for both endwise and rotational movement and mounting a tool, a generally circular templet having its center on the axis of the spindle, an adjustable mount for the templet and embodying two concentric rings adjustable on axes that are at right angles to each other and in a plane transverse to the spindle axis, and an adjustable tracer carried by the spindle and in operative engagement with a face of said templet.

5. In a machine of the character described, having a spindle mounted for both endwise and rotational movement and mounting a tool, a generally circular templet having its center on the axis of the spindle, an adjustable mount for the templet and embodying two concentric rings adjustable on axes that are at right angles to each other and in a plane transverse to the spindle axis, and an adjustable tracer carried by the spindle and in operative engagement with a face of said templet, said face of the templet being arcuate.

6. A pipe-cutting machine comprising a base to engage a pipe to be cut, a post extending from said base, a head on the upper end of the post and including a bracket having vertically aligned bearings, a spindle mounted to slide in said bearings, means extending through the head to rotate the spindle, a templet having a central hole through which the spindle extends, an adjustable tracer on the spindle in operative engagement with the templet, an adjustable mount for the templet for adjusting the same on two axes at right angles to each other, said axes being in a plane transverse to the axis of the spindle, said mount comprising an inner ring fixedly connected to and surrounding the templet, a concentric ring around the inner ring and carrying the axis of said inner ring, and a fixed support for the axis of the outer ring, and a pipe-cutting tool on the spindle and movable in a path similar to the path of movement of the tracer during rotation of the spindle.

7. A pipe-cutting machine comprising a base to engage a pipe to be cut, a post extending from said base, a head on the upper end of the post and including a bracket having vertically aligned bearings, a spindle mounted to slide in said bearings, means extending through the head to rotate the spindle, a templet having a central hole through which the spindle extends, an adjustable tracer on the spindle in operative engagement with the templet, said templet having an arcuate face and said tracer being engaged with said face, an adjustable mount for the templet for adjusting the same on two axes at right angles to each other, said axes being in a plane transverse to the axis of the spindle, said mount comprising an inner ring fixedly connected to and surrounding the templet, a concentric ring around the inner ring and carrying the axis of said inner ring, and a fixed support for the axis of the outer ring, and a pipe-cutting tool on the spindle and movable in a path similar to the path of movement of the tracer during rotation of the spindle.

SAM G. MARINOVICH.

REFERENCES CITED

The following references are of record in the file of this patent:

UNITED STATES PATENTS

| Number | Name | Date |
| --- | --- | --- |
| 1,826,164 | Carrier et al. | Oct. 6, 1931 |
| 1,858,076 | Douglass | May 10, 1932 |
| 2,429,559 | Matson | Oct. 21, 1947 |
| 2,437,025 | Hatten | Mar. 2, 1948 |